US009087226B2

(12) United States Patent
Batra et al.

(10) Patent No.: US 9,087,226 B2
(45) Date of Patent: Jul. 21, 2015

(54) SYSTEM, METHOD AND COMPUTER PROGRAM PRODUCT FOR CALIBRATING INTERROGATOR SIGNAL STRENGTH AND/OR TAG RESPONSE RANGE SETTING

(75) Inventors: Naresh Batra, Saratoga, CA (US); Heena Nandu, Sunnyvale, CA (US)

(73) Assignee: Intelleflex Corporation, San Jose, CA (US)

( * ) Notice: Subject to any disclaimer, the term of this patent is extended or adjusted under 35 U.S.C. 154(b) by 1039 days.

(21) Appl. No.: 11/423,414

(22) Filed: Jun. 9, 2006

(65) Prior Publication Data
US 2007/0290802 A1 Dec. 20, 2007

(51) Int. Cl.
*H04Q 5/22* (2006.01)
*G06K 7/00* (2006.01)
*G06K 7/10* (2006.01)
*H04B 5/00* (2006.01)
*H04B 17/21* (2015.01)

(52) U.S. Cl.
CPC .......... *G06K 7/0008* (2013.01); *G06K 7/10039* (2013.01); *H04B 5/0062* (2013.01); *H04B 17/21* (2015.01)

(58) Field of Classification Search
CPC ............. B62B 5/0096; G06K 19/0707; G06K 2017/0045; G06K 7/10237
USPC ........... 340/10.31, 10.4, 572.1; 342/450, 451, 342/465
See application file for complete search history.

(56) References Cited

U.S. PATENT DOCUMENTS

| | | | |
|---|---|---|---|
| 5,500,651 A * | 3/1996 | Schuermann .................... 342/42 |
| 5,617,060 A | 4/1997 | Wilson et al. ................. 330/129 |
| 5,774,876 A | 6/1998 | Woolley et al. ................. 705/28 |
| 5,926,747 A | 7/1999 | Komara et al. ................. 455/69 |
| 5,959,568 A | 9/1999 | Woolley .......................... 342/42 |
| 6,127,928 A * | 10/2000 | Issacman et al. .......... 340/572.1 |
| 6,356,764 B1 | 3/2002 | Ovard et al. .................. 455/456 |
| 6,380,894 B1 * | 4/2002 | Boyd et al. .................... 342/450 |
| 6,486,769 B1 * | 11/2002 | McLean .................... 340/10.32 |
| 6,734,797 B2 | 5/2004 | Shanks et al. ............. 340/572.4 |
| 6,784,813 B2 | 8/2004 | Shanks et al. ................... 341/53 |
| 6,868,073 B1 * | 3/2005 | Carrender .................... 370/278 |

(Continued)

OTHER PUBLICATIONS

International Search Report and Written Opinion from PCT Application No. PCT/US07/13177 mailed on Mar. 19, 2008.

(Continued)

*Primary Examiner* — Daniell L Negron
*Assistant Examiner* — Son M Tang
(74) *Attorney, Agent, or Firm* — Zilka-Kotab, PC

(57) ABSTRACT

A system, method and computer program product according to one embodiment are provided for calibrating an RFID interrogator. A signal is sent from an interrogator to a calibration device. A backscatter signal is received from the calibration device. The backscatter from the calibration device is analyzed. An outgoing signal strength of the interrogator is adjusted based on the analysis. In a system, method and computer program product according to another embodiment, the interrogator is set to selectively respond to tags returning a backscatter signal strength selected based on the analysis. In a system, method and computer program product according to another embodiment, comparison criteria is selected based on the analysis of the backscatter signal. An RF device is instructed to store the comparison criteria, which is then used by the RF device to selectively respond to an interrogator signal having at least a desired strength.

36 Claims, 7 Drawing Sheets

(56) References Cited

U.S. PATENT DOCUMENTS

| | | |
|---|---|---|
| 6,956,509 B2 | 10/2005 | Shanks et al. .................. 341/53 |
| 7,030,761 B2 * | 4/2006 | Bridgelall et al. ......... 340/572.2 |
| 7,054,595 B2 | 5/2006 | Bann .......................... 455/41.2 |
| 7,120,550 B2 * | 10/2006 | Diorio et al. .................. 702/107 |
| 7,142,815 B2 * | 11/2006 | Desjeux et al. ............. 455/41.2 |
| 7,145,437 B2 * | 12/2006 | Jalkanen et al. ............. 340/10.3 |
| 7,152,791 B2 * | 12/2006 | Chappidi et al. ............. 235/385 |
| 7,202,784 B1 * | 4/2007 | Herwig ...................... 340/568.1 |
| 7,283,037 B2 * | 10/2007 | Diorio et al. ................ 340/10.51 |
| 7,388,468 B2 * | 6/2008 | Diorio et al. ................ 340/10.4 |
| 7,548,153 B2 * | 6/2009 | Gravelle et al. ............. 340/10.3 |
| 8,412,109 B2 * | 4/2013 | Voutilainen et al. ....... 455/67.11 |
| 2002/0090958 A1 | 7/2002 | Ovard et al. ................. 455/456 |
| 2002/0127970 A1 | 9/2002 | Martinez ........................ 455/41 |
| 2002/0149480 A1 | 10/2002 | Shanks et al. ............. 340/572.1 |
| 2004/0056091 A1 | 3/2004 | Overhultz et al. ........... 235/382 |
| 2004/0145454 A1 | 7/2004 | Powell et al. ................ 340/10.2 |
| 2005/0040961 A1 * | 2/2005 | Tuttle ......................... 340/693.3 |
| 2005/0059355 A1 * | 3/2005 | Liu ............................ 455/67.14 |
| 2005/0190098 A1 | 9/2005 | Bridgelall et al. ............ 342/118 |
| 2005/0206555 A1 | 9/2005 | Bridgelall et al. ............ 342/127 |
| 2005/0225436 A1 * | 10/2005 | Diorio et al. ................ 340/10.51 |
| 2005/0264416 A1 | 12/2005 | Maurer .................... 340/539.13 |
| 2006/0006986 A1 * | 1/2006 | Gravelle et al. ............. 340/10.3 |
| 2006/0022815 A1 | 2/2006 | Fischer et al. ................ 340/505 |
| 2006/0049946 A1 | 3/2006 | Sullivan et al. ............ 340/577.7 |
| 2006/0077082 A1 | 4/2006 | Shanks et al. ................ 341/120 |
| 2006/0176152 A1 * | 8/2006 | Wagner et al. ............. 340/10.2 |
| 2006/0238302 A1 * | 10/2006 | Loving et al. ............... 340/10.1 |
| 2007/0001848 A1 * | 1/2007 | Shanks ...................... 340/572.1 |
| 2007/0001856 A1 * | 1/2007 | Diorio et al. ............... 340/572.1 |
| 2007/0262872 A1 * | 11/2007 | Carrender et al. .......... 340/572.7 |
| 2007/0279194 A1 * | 12/2007 | Carrender et al. ........... 340/10.4 |
| 2007/0285237 A1 * | 12/2007 | Batra et al. ................ 340/572.1 |
| 2008/0024279 A1 * | 1/2008 | Gravelle et al. ............. 340/10.3 |

OTHER PUBLICATIONS

International Preliminary Examination Report from PCT Application No. PCT/US07/13177 mailed on Nov. 18, 2008.

* cited by examiner

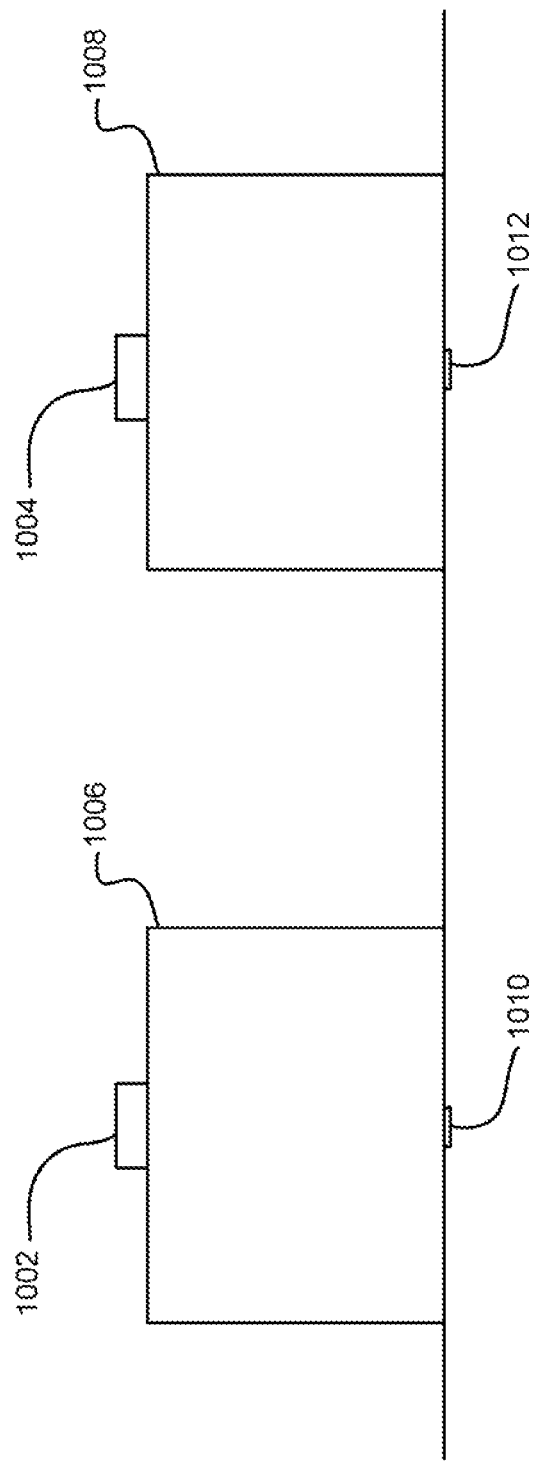

SYSTEM, METHOD AND COMPUTER PROGRAM PRODUCT FOR CALIBRATING INTERROGATOR SIGNAL STRENGTH AND/OR TAG RESPONSE RANGE SETTING

RELATED APPLICATION

This application is related to U.S. patent application entitled "RF DEVICE COMPARING DAC OUTPUT TO INCOMING SIGNAL FOR SELECTIVELY PERFORMING AN ACTION" and filed concurrently herewith, and which is herein incorporated by reference.

FIELD OF THE INVENTION

The present invention relates to Radio Frequency Identification (RFID) systems and methods, and more particularly, this invention relates to use of one or more devices for calibrating the signal strength of an interrogator and/or calibrating the tag response range setting.

BACKGROUND OF THE INVENTION

Automatic identification ("Auto-ID") technology is used to help machines identify objects and capture data automatically. One of the earliest Auto-ID technologies was the bar code, which uses an alternating series of thin and wide bands that can be digitally interpreted by an optical scanner. This technology gained widespread adoption and near-universal acceptance with the designation of the Universal Product Code ("UPC")—a standard governed by an industry-wide consortium called the Uniform Code Council. Formally adopted in 1973, the UPC is one of the most ubiquitous symbols present on virtually all manufactured goods today and allowed for enormous efficiency in the tracking of goods through the manufacturing, supply, and distribution of various goods.

However, the bar code still requires manual interrogation by a human operator to scan each tagged object individually with a scanner. This is a line-of-sight process that has inherent limitations in speed and reliability. In addition, the UPC bar codes only allow for manufacturer and product type information to be encoded in to the barcode, not the unique item's serial number. The bar code on one milk carton is the same as every other, making it impossible to count objects or individually check expiration dates, much less find one particular carton of many.

Currently, retail items are marked with barcode labels. These printed labels have over 40 "standard" layouts, can be mis-printed, smeared, mis-positioned and mis-labeled. In transit, these outer labels are often damaged or lost. Upon receipt, the pallets typically have to be broken-down and each case scanned into an enterprise system. Error rates at each point in the supply chain have been 4-18% thus creating a billion dollar inventory visibility problem. However, Radio Frequency Identification (RFID) allows the physical layer of actual goods to automatically be tied into software applications, to provide accurate tracking.

The emerging RFID technology employs a Radio Frequency (RF) wireless link and ultra-small embedded computer chips, to overcome these barcode limitations. RFID technology allows physical objects to be identified and tracked via these wireless "tags". It functions like a bar code that communicates to the interrogator automatically without needing manual line-of-sight scanning or singulation of the objects.

The use of RFID tags are also quickly gaining popularity for use in the monitoring and tracking of an item. RFID technology allows a user to remotely store and retrieve data in connection with an item utilizing a small, unobtrusive tag. As an RFID tag operates in the radio frequency (RF) portion of the electromagnetic spectrum, an electromagnetic or electrostatic coupling can occur between an RFID tag affixed to an item and an RFID tag interrogator. This coupling is advantageous, as it precludes the need for a direct contact or line of sight connection between the tag and the interrogator.

Utilizing an RFID tag, an item may be tagged at a period when the initial properties of the item are known. For example, this first tagging of the item may correspond with the beginning of the manufacturing process, or may occur as an item is first packaged for delivery. Electronically tagging the item allows for subsequent electronic exchanges of information between the tagged item and a user, wherein a user may read information stored within the tag.

Many RFID systems use reflected or "backscattered" RF waves to transmit information from the tag to the interrogator. However, temperature, humidity, and other factors affect RF performance. As a results, the strength of a backscatter response from a tag will vary over a period of time even if the tag and interrogator are perfectly stationary. What is therefore needed is a way to help account for the change in environmental conditions to improve the accuracy of the interrogator and/or tag, e.g., to improve the probability that only desired RFID tag backscatter signal information is being analyzed by the interrogator.

SUMMARY OF THE INVENTION

A system, method and computer program product according to one embodiment are provided for calibrating an RFID interrogator. A signal is sent from an interrogator to a calibration device. A backscatter signal is received from the calibration device. The backscatter from the calibration device is analyzed. Outgoing signal strength of the interrogator is adjusted based on the analysis.

A system, method and computer program product according to another embodiment are provided for calibrating an RFID interrogator. A signal is sent from an interrogator to a calibration device. A backscatter signal is received from the calibration device. The backscatter from the calibration device is analyzed. The interrogator is set to selectively respond to tags returning a backscatter signal strength selected based on the analysis.

A system, method and computer program product according to another embodiment are provided for setting a response comparison criteria for a Radio Frequency (RF) device. A signal is sent from an interrogator to a calibration device. A backscatter signal is received from the calibration device. The backscatter from the calibration device is analyzed. Comparison criteria is selected based on the analysis of the backscatter signal. An RF device is instructed to store the comparison criteria, which is then used by the RF device to selectively respond to an interrogator signal having at least a desired strength.

An RFID system in which the present invention may be embodied includes a plurality of RFID tags and an RFID interrogator in communication with the RFID tags. Each tag may be coupled to an object, each tag storing information about the object to which coupled. Likewise, each tag may have a unique identifier, the identifier being correlated with information about the object in a database.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 10 depicts an implementation of the present invention according to one embodiment.

BEST MODE FOR CARRYING OUT THE INVENTION

Figure 1:
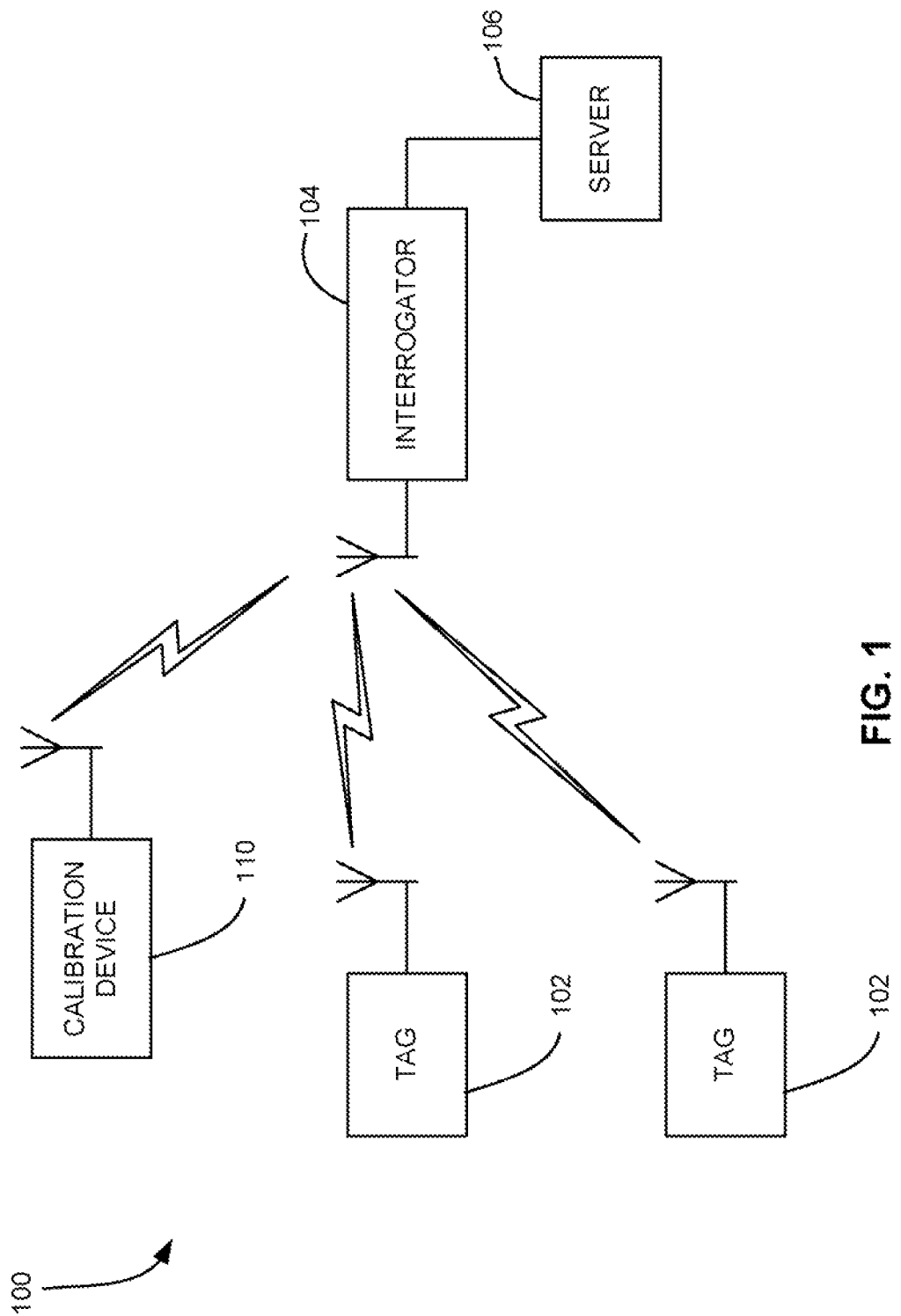
FIG. 1 is a system diagram of an RFID system according to one embodiment of the present invention.

The following description is the best mode presently contemplated for carrying out the present invention. This description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and as defined in dictionaries, treatises, etc.

The present invention can be portrayed in a variety of embodiments. One illustrative embodiment includes a system, method and computer program product that uses a calibration device to help ensure an RFID system functions in a reliable, consistent, and/or desirable manner. Other embodiments are directed to portions and aspects of the overall system.

Many types of devices can take advantage of the embodiments disclosed herein, including but not limited to RFID systems and other wireless devices/systems. To provide a context, and to aid in understanding the various embodiments, much of the present description shall be presented in terms of an RFID system such as that shown in FIG. 1. It should be kept in mind that this is done by way of example only, and the invention is not to be limited to RFID systems, as one skilled in the art will appreciate how to implement the teachings herein into electronics devices in hardware and/or software. In other words, various embodiments can be implemented entirely in hardware, entirely in software, or a combination of the two. Examples of hardware include Application Specific Integrated Circuits (ASICs), printed circuits, monolithic circuits, reconfigurable hardware such as Field Programmable Gate Arrays (FPGAs), etc. The invention can also be provided in the form of a computer program product comprising a computer readable medium having computer code thereon that, when executed, causes a computer or interrogator to perform the methodology disclosed herein. A computer readable medium can include any medium capable of storing computer code thereon for use by a computer, including optical media such as read only and writeable CD and DVD, magnetic memory, semiconductor memory (e.g., FLASH memory and other portable memory cards, etc.) etc. Further, such software can be downloadable or otherwise transferable from one computing device to another via network, wireless link, nonvolatile memory device, etc.

A computer for storing and/or executing the code and/or performing the processes described herein can be any type of computing device, including a personal computer (PC), laptop PC, handheld device (e.g., personal digital assistant (PDA)), portable telephone, etc.

The use of RFID tags are quickly gaining popularity for use in the monitoring and tracking of an item. RFID technology allows a user to remotely store and retrieve data in connection with an item utilizing a small, unobtrusive tag. As an RFID tag operates in the radio frequency (RF) portion of the electromagnetic spectrum, an electromagnetic or electrostatic coupling can occur between an RFID tag affixed to an item and an RFID tag interrogator. This coupling is advantageous, as it precludes the need for a direct contact or line of sight connection between the tag and the interrogator.

Utilizing an RFID tag, an item may be tagged at a period when the initial properties of the item are known. For example, this first tagging of the item may correspond with the beginning of the manufacturing process, or may occur as an item is first packaged for delivery. Electronically tagging the item allows for subsequent electronic exchanges of information between the tagged item and a user, wherein a user may read information stored within the tag and may additionally write information to the tag. For example, each tag may store information about the object to which coupled. A tagged object can be identified and located by identifying and locating the tag coupled to it.

As shown in FIG. 1, an RFID system 100 typically includes RFID tags 102, an interrogator or "reader" 104, and an optional server 106 or other backend system which may include databases containing information relating to RFID tags and/or tagged items. Each tag 102 may be coupled to an object. Each tag 102 includes a chip and an antenna. The chip includes a digital decoder needed to execute the computer commands that the tag 102 receives from the interrogator 104. The chip may also include a power supply circuit to extract and regulate power from the RF interrogator; a detector to decode signals from the interrogator; a backscatter modulator, a transmitter to send data back to the interrogator; anti-collision protocol circuits; and at least enough memory to store its unique identification code, e.g., Electronic Product Code (EPC).

The EPC is a simple, compact identifier that uniquely identifies objects (items, cases, pallets, locations, etc.) in the supply chain. The EPC is built around a basic hierarchical idea that can be used to express a wide variety of different, existing numbering systems, like the EAN, UCC System Keys, UID, VIN and other numbering systems. Like many current numbering, schemes used in commerce, the EPC is divided into numbers that identify the manufacturer and product type. In addition, the EPC uses an extra set of digits, a serial number, to identify unique items. A typical EPC number contains:

1. Header, which identifies the length, type, structure, version and generation of EPC;
2. Manager Number, which identifies the company or company entity;
3. Object Class, similar to a stock keeping unit or SKU; and
4. Serial Number, which is the specific instance of the Object Class being tagged.

Additional fields may also be used as part of the EPC in order to properly encode and decode information from different numbering systems into their native (human-readable) forms.

Each tag 102 may also store information about the item to which coupled, including but not limited to a name or type of item, serial number of the item, date of manufacture, place of manufacture, owner identification, origin and/or destination information, expiration date, composition, information relating to or assigned by governmental agencies and regulations, etc. Furthermore, data to an item can be stored in one or more databases linked to the RFID tag. These databases do not reside on the tag, but rather are linked to the tag through a unique identifier(s) or reference key(s).

Communication begins with an interrogator 104 sending out signals via radio wave to find a tag 102. When the radio wave hits the tag 102 and the tag 102 recognizes and responds to the interrogator's signal, the interrogator 104 decodes the data programmed into the tag 102. The information is then passed to a server 106 for processing, storage, and/or propagation to another computing device. By tagging a variety of items, information about the nature and location of goods can be known instantly and automatically.

Many RFID systems use reflected or "backscattered" radio frequency (RF) waves to transmit information from the tag 102 to the interrogator 104. Since passive (Class-1 and Class-2) tags get all of their power from the interrogator signal, the tags are only powered when in the beam of the interrogator 104.

The Auto ID Center EPC-Compliant tag classes are set forth below:
Class-1
  Identity tags (RF user programmable, range ~3 m)
  Lowest cost
Class-2
  Memory tags (20 bit address space programmable at ~3 m range)
  Security & privacy protection
  Low cost
Class-3
  Semi-passive tags (also called semi-active tags)
  Battery tags (256 bits to 2M words)
  Self-Powered Backscatter (internal clock, sensor interface support)
  ~100 meter range
  Moderate cost
Class-4
  Active tags
  Active transmission (permits tag-speaks-first operating modes)
  ~30,000 meter range
  Higher cost In RFID systems where passive receivers (i.e., Class-1 and Class-2 tags) are able to capture enough energy from the transmitted RF to power the device, no batteries are necessary. In systems where distance prevents powering a device in this manner, an alternative power source must be used. For these "alternate" systems (also known as semi-active or semi-passive), batteries are the most common form of power. This greatly increases read range, and the reliability of tag reads, because the tag does not need power from the interrogator to respond. Class-3 tags only need a 5 mV signal from the interrogator in comparison to the 500 mV that Class-1 and Class-2 tags typically need to operate. This 100:1 reduction in power requirement along with the reader's ability to sense a very small backscattered signal enables the tag permits Class-3 tags to operate out to a free space distance of 100 meters or more compared with a Class-1 range of only about 3 meters. Note that semi-passive and active tags may also operate in passive mode, using only energy captured from an incoming RF signal to operate and respond.

Active, semi-passive and passive RFID tags may operate within various regions of the radio frequency spectrum. Low-frequency (30 KHz to 500 KHz) tags have low system costs and are limited to short reading ranges. Low frequency tags may be used in security access and animal identification applications for example. High-frequency (860 MHz to 960 MHz and 2.4 GHz to 2.5 GHz) tags offer increased read ranges and high reading speeds. One illustrative application of high frequency tags is automated toll collection on highways and interstates.

The system 100 of FIG. 1 may also include a calibration device 110, which itself may be an RFID tag or a device capable of backscattering or otherwise transmitting a signal. The calibration device 110 and its use are discussed in detail below.

Figure 2:
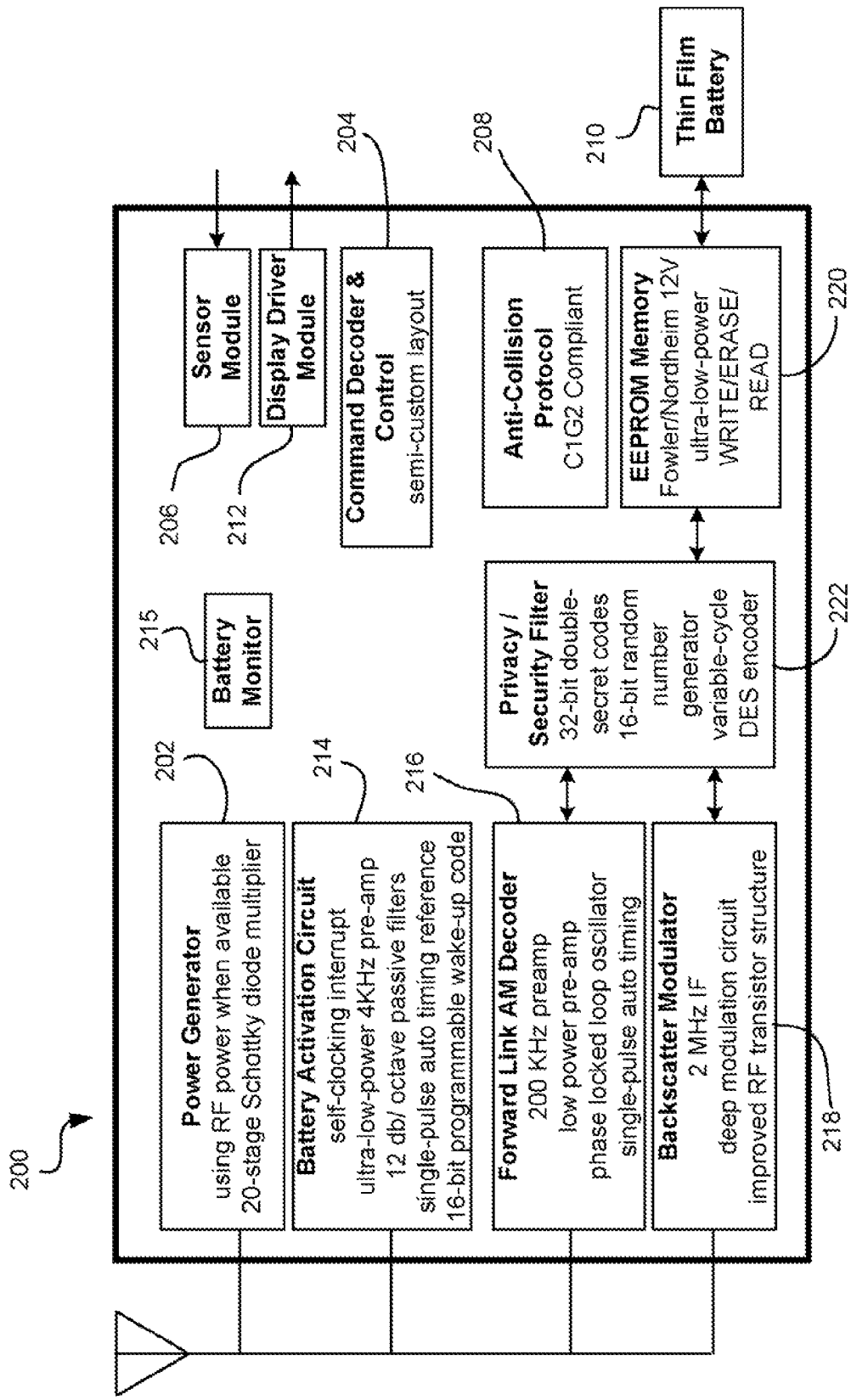
FIG. 2 is a system diagram for an integrated circuit (IC) chip for implementation in an RFID tag according to one embodiment of the present invention.

Embodiments of the present invention are preferably implemented on or in conjunction with a Class-3 or higher Class chip (processor). FIG. 2 depicts a circuit layout of a Class-3 chip 200 according to an illustrative embodiment for implementation in an RFID tag. This Class-3 chip can form the core of RFID chips appropriate for many applications such as identification of pallets, cartons, containers, vehicles, or anything where a range of more than 2-3 meters is desired. As shown, the chip 200 includes several industry-standard circuits including a power generation and regulation circuit 202, a digital command decoder and control circuit 204, a sensor interface module 206, a C1G2 interface protocol circuit 208, and a power source (battery) 210. A display driver module 212 can be added to drive a display.

A battery activation circuit 214 is also present to act as a wake-up trigger. In brief, many portions of the chip 200 remain in hibernate state during periods of inactivity. A hibernate state may mean a low power state, or a no power state. The battery activation circuit 214 remains active and processes incoming signals to determine whether any of the signals contain an activate command. If one signal does contain a valid activate command, additional portions of the chip 200 are wakened from the hibernate state, and communication with the interrogator can commence. In one embodiment, the battery activation circuit 214 includes an ultra-low-power, narrow-bandwidth preamplifier with an ultra low power static current drain. The battery activation circuit 214 also includes a self-clocking interrupt circuit and uses an innovative user-programmable digital wake-up code. The battery activation circuit 214 draws less power during its sleeping state and is much better protected against both accidental and malicious false wake-up trigger events that otherwise would lead to pre-mature exhaustion of the Class-3 tag battery 210.

A battery monitor 215 can be provided to monitor power usage in the device. The information collected can then be used to estimate a useful remaining life of the battery.

A forward link AM decoder 216 uses a simplified phase-lock-loop oscillator that requires an absolute minimum amount of chip area. Preferably, the circuit 216 requires only a minimum string of reference pulses.

A backscatter modulator block 218 preferably increases the backscatter modulation depth to more than 50%.

A memory cell, e.g., EEPROM, is also present. In one embodiment, a pure, Fowler-Nordheim direct-tunneling-through-oxide mechanism 220 is present to reduce both the WRITE and ERASE currents to about 2 $\mu$A/cell in the EEPROM memory array. Unlike any RFID tags built to date, this will permit designing of tags to operate at maximum range even when WRITE and ERASE operations are being performed. In other embodiments, the WRITE and ERASE currents may be higher or lower, depending on the type of memory used and its requirements.

The module 200 may also incorporate a highly-simplified, yet very effective, security encryption circuit 222. Other security schemes, secret handshakes with interrogators, etc. can be used.

Only four connection pads (not shown) are required for the chip 200 to function: Vdd to the battery, ground, plus two antenna leads to support multi-element omni-directional and isotropic antennas. Sensors to monitor temperature, shock, tampering, etc. can be added by appending an industry-standard I$^2$C or SPI interface to the core chip.

It should be kept in mind that the present invention can be implemented using any type of tag, and the circuit 200 described above is presented as only one possible implementation.

Figure 3:
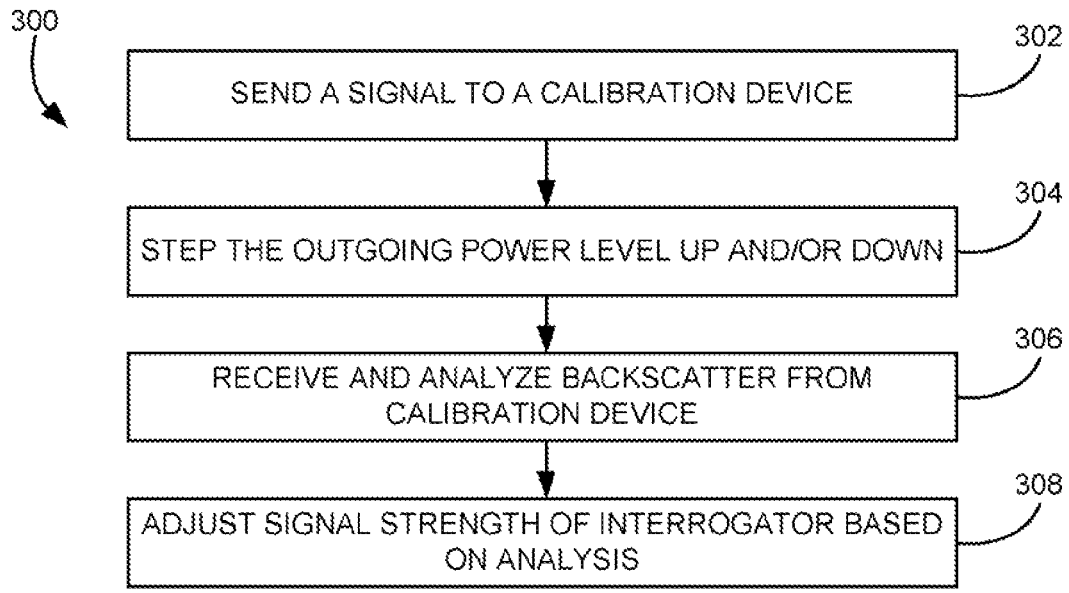
FIG. 3 is a flow diagram of a general method for calibrating a reader outgoing signal strength according to one embodiment of the present invention.

FIG. 3 illustrates a general method 300 for calibrating a reader outgoing signal strength, e.g., to account for environmental conditions. In operation 302, the RFID system interrogator sends a signal to a calibration device at a predetermined or random time, at predetermined intervals, at random time intervals, upon detecting a change in environmental conditions (e.g., temperature, humidity, presence of rain, presence of fog or smog, etc.), etc. and combination thereof. In operation 304, the interrogator steps up and/or down the transmitting power while sending the signal or series of signals. The interrogator receives and analyzes the backscatter obtained from the calibration device at the various transmitted power levels in operation 306. Based on the analysis of the backscatter, the interrogator can adjust its signal strength in operation 308. For example, in order to interrogate tags only within a certain range, the interrogator may reduce its signal strength. In another example, if environmental conditions would likely create interference or otherwise hinder communication with tags as determined by the analysis, the interrogator may step up its power above a normal level.

Figure 4:
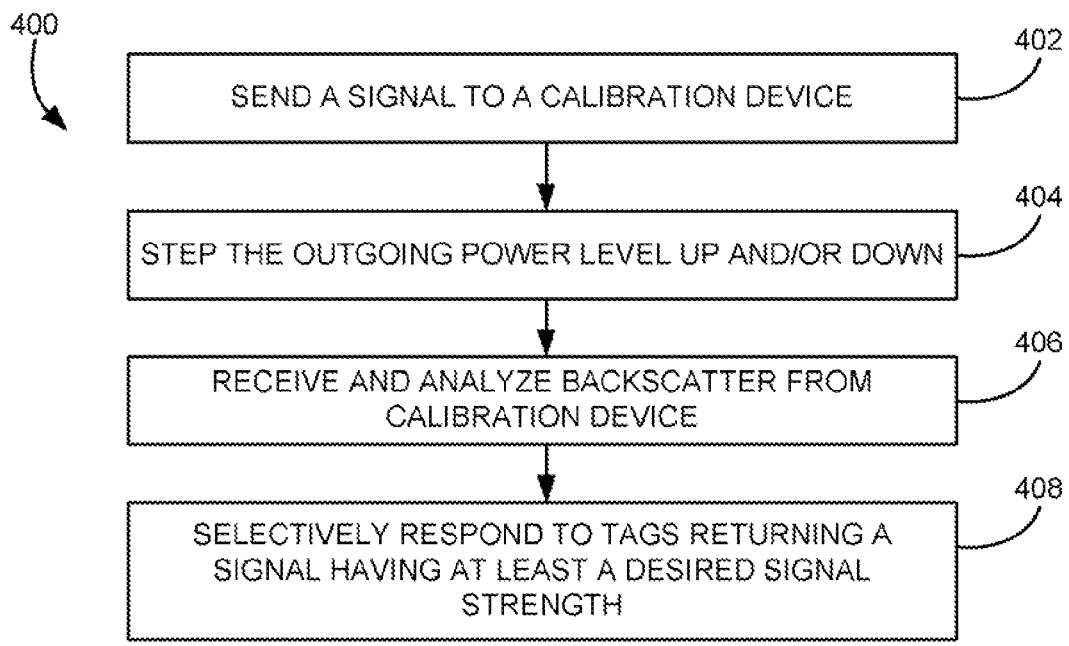
FIG. 4 is a diagram of a general method for calibrating a reader to selectively communicate with tags returning at least a desired backscatter signal strength according to one embodiment of the present invention.

FIG. 4 illustrates a general method 400 for calibrating a reader to selectively communicate with tags returning at least a desired backscatter signal strength, e.g., to account for environmental conditions. In operation 402, the RFID system interrogator sends a signal to a calibration device at a predetermined or random time, at predetermined intervals, or at random time intervals. In operation 404, the interrogator steps up and/or down the transmitting power while sending the signal or series of signals. The interrogator receives and analyzes the backscatter obtained from the calibration device at the various transmitted power levels in operation 406. Based on the analysis of the backscatter, the interrogator can selectively respond to tags returning a signal having at least the desired strength in operation 408.

In various permutations of the present invention, the interrogator may perform a combination or hybrid of the operations shown in FIGS. 3-4.

Calibration devices may be permanently mounted in certain locations, or may be removable and portable. However, it is desirable that an approximate distance between the calibration device(s) and the interrogator is known, as the backscatter signal strength is a function of distance from the interrogator.

Calibration devices may include, but are not limited to, devices such as powered (active and semi-passive) RFID tags or other transponders/transmitters, non-powered (passive) RFID tags or transponders, other interrogators, etc. Additionally, a calibration device may be powered by a permanent power supply, such as a transformer connected to a main power line, or may be powered by a portable power supply such as one or more batteries. The calibration device could also be powered by an alternative power source, such as solar power.

As mentioned above, the calibration device is preferably positioned at a known distance from the interrogator antenna so that consistency of results can be obtained. Ideally, the calibration device is fixed, but mobile/detachable calibration devices are also contemplated. The latter may be useful in situations, e.g., where the best location for the calibration device is physically "in the way" of other activities, or conflicts with desirable performance of an RFID system, and so should be removed after calibration is performed.

Examples of calibration device backscatter are signals containing predefined strings of data, a particular ID code (e.g., of the calibration device), a harmonic signal, etc.

As mentioned previously, the calibration device backscatter can be analyzed at various time intervals. For example, backscatter can be analyzed in intervals from fractions of a second to periods of every hour or longer. Analysis can also be performed at randomly generated time increments or in response to changing environmental conditions or other predetermined events, etc.

Analysis can be performed by the interrogator itself or by another unit coupled to the interrogator, such as a server, host, PC, etc. Where applicable, the unit performing the analysis and the interrogator may be coupled through a direct network connection, wireless connection, hard-wired connection, etc.

The results of backscatter measuring and analysis may be maintained in a table. The table may also contain other data, such as historical signal data, etc. for use in optimizing algorithms, etc. An illustrative set of results presented below:

| Interrogator outgoing signal strength | Backscatter signal strength rcvd by interrogator |
|---|---|
| 100 mW | 0.0 V |
| 110 mW | 0.1 V |
| 180 mW | 0.3 V |
| 200 mW | 0.5 V |
| 300 mW | 1.0 V |

The results of the backscatter measuring provides the backscatter signal strength generated for a given outgoing interrogator signal strength. This backscatter signal strength corresponds to the backscatter that will be generated by tags in the vicinity of the interrogator at a given power level at an approximate distance from the interrogator. For example, in the above table an interrogator transmitting a signal with a strength of 180 mW receives a backscatter signal from the calibration device measuring 0.3V at X meters, where X meters is the distance between the calibrating device and the interrogator antenna.

The interrogator can use the results of the backscatter measuring and analysis to adjust the signal strength of the interrogator, e.g. in order to interrogate tags within a certain proximity. One example of this involves the interrogator limiting or increasing its signal strength so that its signal is powerful enough to generate useable backscatter on RFID tags within a determined range. For instance, in one embodiment of the invention, the interrogator's outgoing signal at a power of 110 mW, returns a signal of 0.1V, and an outgoing signal of anything less than 100 mW returns no backscatter signal (0.0V). The interrogator can then limit its signal strength to 110 mW, thereby limiting its range of communication to a distance only as far as the location of the calibration device. As a result, any device that produces backscatter and is farther than the calibration device from the interrogator will not result in effective communication between the device and the interrogator.

The interrogator can also use the results of backscatter measuring and analysis to selectively respond to tags returning a signal having at least a desired strength, considering the environmental conditions at the time of the backscatter measuring and analysis. This would indicate that the RFID tags returning a certain backscatter signal are within a certain range of the interrogator. In one example, an outgoing signal at a power of 180 mW returns a signal of 0.3V, and an outgoing signal at a power of 300 mW returns a signal of 1.0V. The interrogator is then set to recognize only backscatter signals of strength equal to or greater than those received from the calibration device at the "in use" outgoing power level, since devices returning a larger backscatter power would be physically closer to the interrogator. For instance, if a 180 mW signal is in use, only return signals over 0.3V would be recognized. If a 300 mW signal is in use, only return signals over 1.0V would be recognized, etc.

In yet another embodiment, the interrogator can both limit its signal strength so that its signal only results in effective communication with RFID tags within a determined range, and selectively respond to tags returning a signal having at least a desired strength. For instance, if communication between an interrogator and calibration tag yielded the above table of signal strengths transmitted and received by the interrogator, the interrogator could then determine which backscatter signal strength was desirable from the table and make that strength the minimum acceptable backscatter strength to be read, while at the same time fixing the interrogator transmission at the corresponding strength. For example, if 0.3V was determined to be the desired backscatter strength from a transmission power of 180 mW, the interrogator could be set to transmit at only 180 mW and acknowledge backscatter signals of at least 0.3V, since any device transmitting a backscatter signal larger than 0.3V would have to be physically closer to the interrogator. The 0.3V threshold would therefore act as a range boundary.

Figure 5:
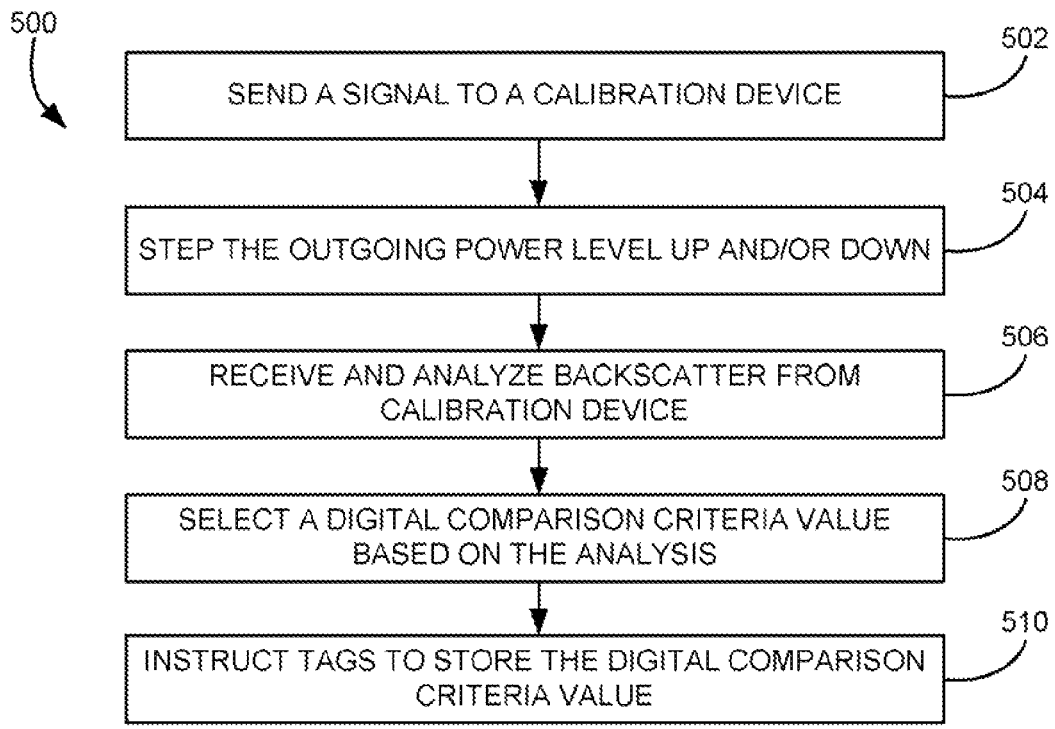
FIG. 5 is a flow diagram of a general method for calibrating a tag to respond to a defined incoming interrogator signal strength according to one embodiment of the present invention.

FIG. 5 illustrates a general method 500 for calibrating a tag to respond to a defined incoming interrogator signal strength, where the defined interrogator signal strength is a relative term referring to either an approximate value or a range. In operation 502, the RFID system interrogator sends a signal to a calibration device at a predetermined or random time, at predetermined intervals, or at random time intervals. In operation 504, the interrogator steps up and/or down the transmitting power while sending the signal or series of signals. The interrogator receives and analyzes the backscatter obtained from the calibration device at the various transmitted power levels in operation 506. Based on the analysis of the backscatter, the interrogator can select a digital comparison criteria value in operation 508. In operation 510, the interrogator instructs the various tags to store the comparison criteria value. The comparison criteria value may then be used by the tag to selectively respond to an interrogator signal based on the incoming interrogator signal strength. In various permutations of the present invention, the interrogator may perform a combination or hybrid of the operations shown in FIGS. 3-5.

Figure 6:
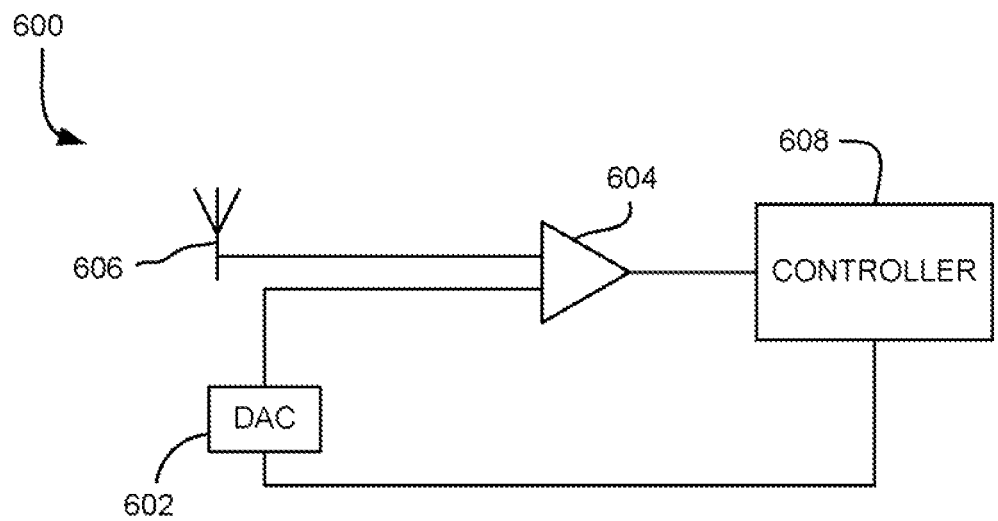
FIG. 6 is a circuit diagram of an RFID circuit with a programmable DAC according to one embodiment of the present invention.

FIG. 6 illustrates one embodiment of an RFID circuit 600 with a programmable DAC 602, the output of which is ultimately used to selectively limit the response of the tag based on criteria received from the interrogator or otherwise programmed into the tag. A DAC is a device used to convert a digital (usually binary) value to an analog signal. Simple switches, a network of resistors, current sources or capacitors may implement this conversion. The analog signal may comprise current, voltage or charges which, for example, can be compared to other signals, for example an interrogator signal received by the tag.

With continued reference to FIG. 6, the DAC 602 in this embodiment may be a device or circuit that is capable of storing an n-bit digital comparison criteria value, e.g., in an on board memory, non-volatile series of latches, etc. Once the criteria value is stored in the DAC 602, the tag may be set to respond to subsequent incoming signals from interrogators, other tags, etc. only if the incoming signal field strength meets the criteria found on the DAC. To accomplish this, the circuit 600 also includes a comparator 604 that compares the DAC output reference signal to a signal derived from the antenna 606. For example, a voltage derived from the incoming interrogator signal can be applied to the comparator 604, along with an analog voltage generated by the DAC 602. The comparator 604 indicates whether the signal derived from the incoming signal matches or exceeds the threshold signal from the DAC 602. If the comparator 604 indicates a match (or excess), the controller 608 or other device can instruct the tag to perform a desired operation. For example, the tag can initiate backscatter in response to the interrogator signal, the tag can emit a sound or emit a light from a light emitting diode (LED), etc.

The tag can also respond in a similar or different manner if the comparison criteria have not been met, e.g., to indicate that the tag is within range of an undesired interrogator, to indicate that the tag is out of range of a desired interrogator, etc. For example, the tag can return to hibernate state if the incoming interrogator signal is below the DAC output level.

Figure 7:
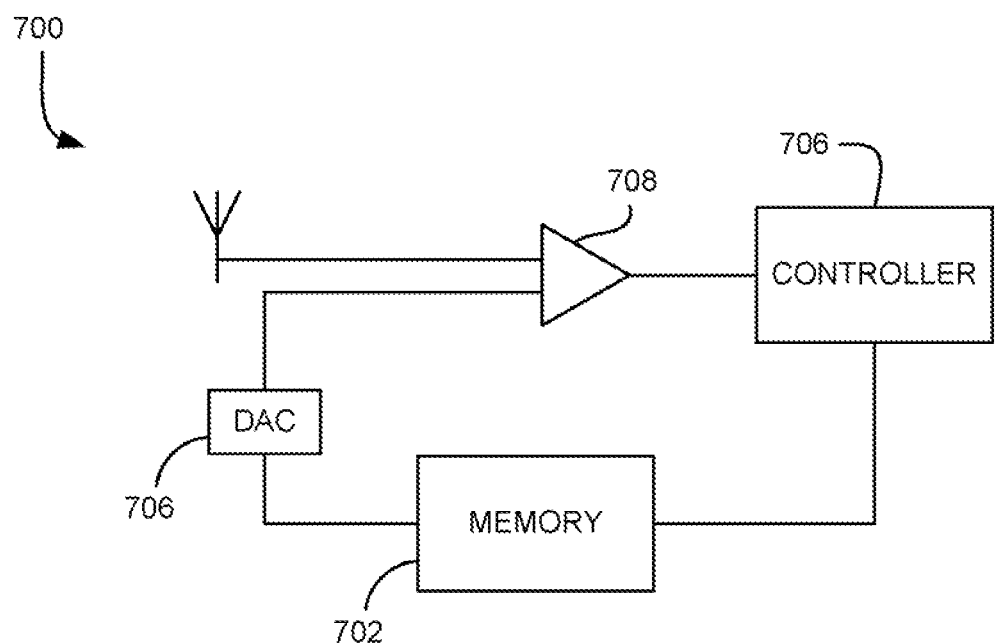
FIG. 7 is a circuit diagram of an RFID circuit in which a digital comparison criteria value is stored in the chip's digital memory.

FIG. 7 depicts another embodiment 700 in which the digital comparison criteria value is stored in the chip's digital memory 702. As above, a DAC 704 is used to generate a signal against which to compare the incoming signal strength. However, the DAC 704 receives the digital threshold value from the memory 702 at the direction of the controller 706. As above, the DAC output reference signal is compared to the incoming raw or processed interrogator signal e.g., using a comparator 708. If the incoming signal matches, exceeds, or is lower than the DAC signal, the tag can perform some action.

Figure 8:
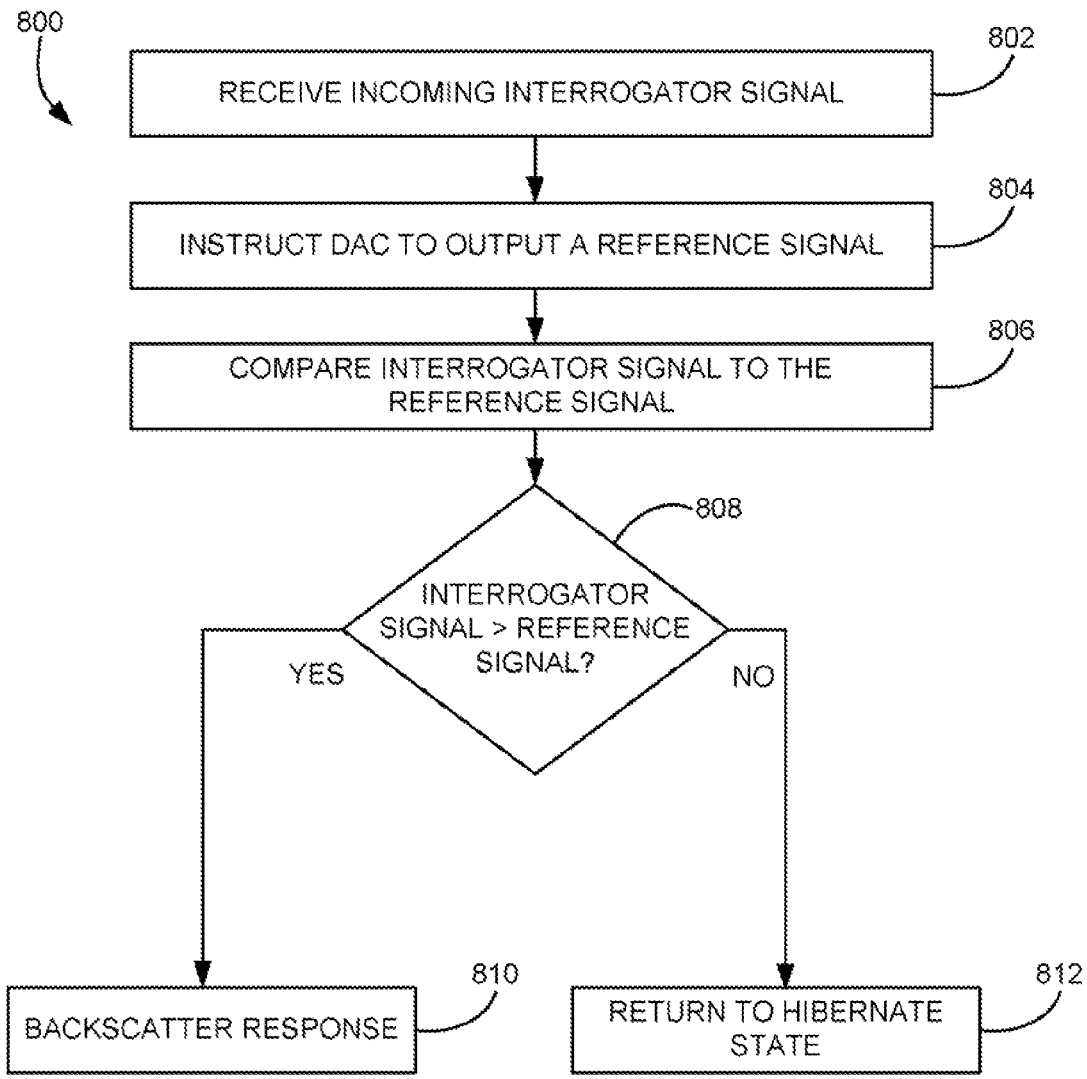
FIG. 8 is a flow diagram of a general method for selectively responding to an interrogator signal based on a strength of an incoming interrogator signal, according to one embodiment of the present invention.

FIG. 8 illustrates a process 800 for selectively responding to an interrogator signal based on a strength of an incoming interrogator signal, according to one embodiment. In operation 802, an incoming interrogator signal is received. In operation 804, the DAC is instructed to output a reference signal based on a digital comparison criteria value. In operation 806, the interrogator signal is compared to the reference signal. At decision 808, a determination is made as to whether the interrogator signal exceeds the reference signal. If it does, the tag backscatters a response in operation 810. If the interrogator signal does not exceed the reference signal, the tag does not backscatter and returns to a hibernate state in operation 812.

Figure 9:
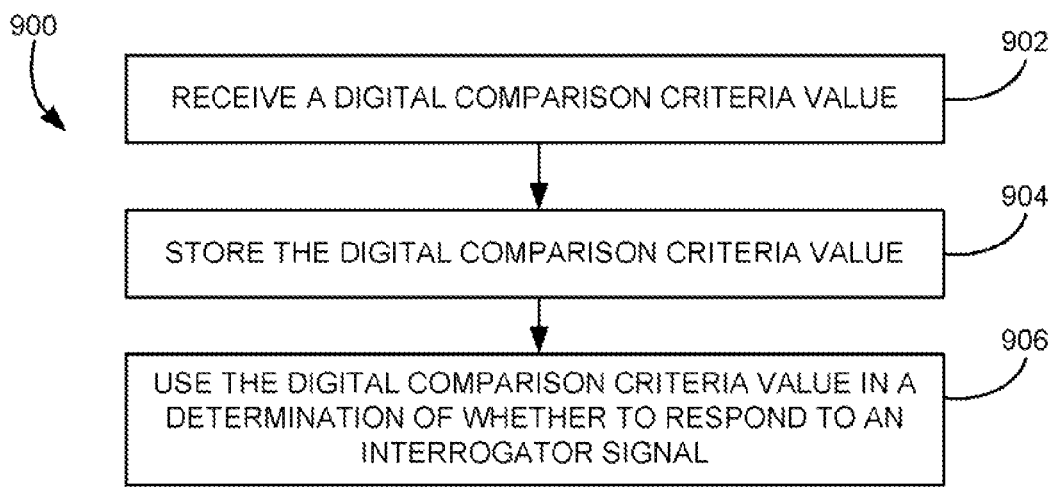
FIG. 9 is a flow diagram of a general method for setting tag response criteria, as performed on the tag, according to one embodiment of the present invention.

FIG. 9 illustrates a process 900 for setting tag response criteria, as performed on the tag. In operation 902, a digital comparison criteria value is received, e.g., from an interrogator via an air interface. In operation 904, the digital comparison criteria value is stored, e.g., on the DAC, in memory etc. In operation 906, the digital comparison criteria value is used to determine whether to respond to an interrogator signal. This may entail using a DAC to generate a reference value against which the incoming interrogator signal strength is compared.

Different types and quantities of comparison criteria can be stored on the RFID tag. For example, two predefined signal levels can be stored on a memory unit located on the tag. This signal levels can include a minimum allowable interrogator signal level for tag response, maximum allowable interrogator signal level for tag response, etc.

The DAC comparison criteria can be set by a user. A tag can receive these criteria via different mechanisms, e.g. by sending an n-bit code through the air interface via the interrogator, etc. The comparison criteria can also be pre-programmed into the DAC, etc.

Authorization to change the digital comparison criteria value may be required. For example, the tag may require receipt of a passcode matching a value stored in memory prior to allowing adjustment of the comparison criteria. This ensures that unauthorized users cannot change the criteria.

Also, several tags may contain a "master" code that allows the interrogator to send a blanket command to multiple tags simultaneously, instructing them to set the comparison criteria to a specified level. Those tags storing the master code will reset the comparison criteria upon receiving the blanket request to do so. Note that some tags may have several master codes stored therein.

EXAMPLES

FIG. 10 depicts an implementation of the present invention according to one embodiment. The present embodiment involves a multiple dock door scenario where each dock door 1002, 1004 has an RFID interrogator 1006, 1008 associated therewith. While two dock doors 1002, 1004 are shown in FIG. 10, one or more docks are possible in this implementation. The interrogators 1006, 1008 or their antenna(s) may be mounted along the edges of the dock door, in a central location in the dock, or may be mounted anywhere within range of the calibration devices found near or in the dock.

Every lane has at least one calibration device 1010, 1012 that may be permanently mounted thereto, and is coupled to a permanent power supply. For example, one or more calibration devices 1010, 1012 can be mounted in each dock door. Looking at dock door 1002, after sending signals of various power levels from the interrogator 1006 to the calibration device 1010 and analyzing the results every hour, the results of the analysis are used to calibrate the system. For example, the results of the analysis can be used to 1) limit the signal strength of the interrogator so that it only interrogates RFID tags within a certain range; 2) set the interrogator to selectively respond to tags returning a signal having at least the desired strength, i.e. tags within a certain range of the interrogator, as opposed to tags located at the next dock door over; and/or 3) instruct the tags to respond only to a given interrogator signal strength.

Another embodiment of the present invention involves one or more highway tollbooth lanes, each lane having an RFID system for identifying and billing automobiles that pass through a tollbooth. One or more interrogator antennas are mounted in the perimeter of the tollbooth entrance. At least some of the automobiles passing through the tollbooth entrance have an RFID tag that is read by the interrogator. At predetermined time increments, or in response to environmental stimuli (i.e., change in temperature, humidity, rain, etc.), the interrogator antennas send signals to one or more calibration devices mounted in the tollbooth area. The interrogator analyzes backscatter information from the calibration device(s) and the results of the analysis are used to either limit the signal strength of the interrogator so that it only interrogates RFID tags within a certain range or to set the interrogator to selectively respond to tags returning a signal having at least the desired strength. This helps ensure that the interrogator for each tollbooth only reads the tag from automobiles in its lane and not adjacent lanes.

One skilled in the art will appreciate how the systems and methods presented herein can be applied to a plethora of scenarios and venues, including but not limited to dock doors, tollbooths, etc. Accordingly, it should be understood that the systems and methods disclosed herein may be used with objects of any type and quantity.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    sending a plurality of outgoing signals from an interrogator to a calibration device, wherein each of the outgoing signals has a different outgoing signal strength;
    for each of the outgoing signals, storing in a table the outgoing signal strength of the outgoing signal;
    for each of the outgoing signals, receiving a corresponding backscatter signal from the calibration device such that a plurality of backscatter signals are received from the calibration device, wherein each of the backscatter signals has a different backscatter signal strength;
    for each of the received backscatter signals, storing in the table the backscatter signal strength of the backscatter signal, wherein each of the stored backscatter signal strengths is stored in association with the stored outgoing signal strength of the corresponding outgoing signal that prompted the backscatter signal having the backscatter signal strength;
    analyzing the table;
    selecting from the table one of the backscatter signal strengths based on the analysis;
    setting the interrogator to selectively respond to tags returning backscatter responses having at least the selected backscatter signal strength;
    receiving backscatter responses from several tags that are positioned within an effective communication range of the interrogator,
    wherein the backscatter responses from the tags that are positioned within the effective communication range of the interrogator comprise:
        one or more signals characterized by a signal strength greater than or equal to the selected backscatter signal strength, and one or more signals characterized by a signal strength less than the selected backscatter signal strength;
selectively responding only to those of the several tags that a backscatter response having at least the selected backscatter signal strength.

2. The method as recited in claim 1,
wherein the table contains historical data.

3. The method as recited in claim 1, wherein the analysis of the table includes analyzing the corresponding backscatter signals for each of the different outgoing signal strengths.

4. The method as recited in claim 1, wherein the table is analyzed at a specified time increment.

5. The method as recited in claim 1, wherein the table is analyzed upon detecting a change in an environmental condition.

6. The method as recited in claim 1, further comprising not responding to the tags returning a backscatter response below the selected backscatter signal strength, wherein the effective communication range of the interrogator is farther than a distance between the interrogator and the calibration device, wherein the tags returning the backscatter response below the selected backscatter signal strength are within the effective communication range.

7. The method as recited in claim 6, wherein an outgoing signal strength used by the interrogator during the receiving the backscatter responses from the several tags that are within the effective communication range of the interrogator at a present outgoing signal strength is the same outgoing signal strength used to selectively respond only to those of the several tags that return the backscatter response having at least the selected backscatter signal strength.

8. The method as recited in claim 1, wherein an outgoing signal strength used by the interrogator during the receiving the backscatter responses from the several tags that are within the effective communication range of the interrogator at a present outgoing signal strength is the same outgoing signal strength used to selectively respond only to those of the several tags that return the backscatter response having at least the selected backscatter signal strength.

9. A method for setting a response comparison criteria for a Radio Frequency (RF) device, comprising:
sending a signal from an interrogator to a calibration device;
receiving a backscatter signal from the calibration device;
analyzing the backscatter from the calibration device;
selecting comparison criteria based on the analysis of the backscatter signal, wherein the comparison criteria includes a minimum allowable interrogator signal level and a maximum allowable interrogator level; and
instructing an RF device to store the comparison criteria, such that the RF device stores the minimum allowable interrogator signal level and the maximum allowable interrogator level,
wherein the comparison criteria is used by the RF device to selectively respond to an interrogator signal having at least the minimum allowable interrogator signal level and less than or equal to the maximum allowable interrogator level.

10. The method as recited in claim 9, wherein the calibration device is located at a known distance from an antenna of the interrogator.

11. The method as recited in claim 9, wherein the calibration device is coupled to a fixed power supply.

12. The method as recited in claim 9, wherein the calibration device is a semi-passive RFID tag.

13. The method as recited in claim 9, wherein the calibration device is a passive RFID tag.

14. The method as recited in claim 9, wherein results of the analysis are maintained in a table.

15. The method as recited in claim 9, wherein results of the analysis are maintained in a table, and
wherein the results of the analysis include analysis of backscatter at differing interrogator power levels.

16. The method as recited in claim 9, further comprising sending a plurality of signals from the interrogator to the RF device, the signals comprising:
interrogator signals having a signal strength less than the minimum allowable interrogator signal level, and
interrogator signals having a signal strength greater than or equal to the minimum allowable interrogator signal level and less than or equal to the maximum allowable interrogator level, and
wherein the RF device selectively responds only to the interrogator signals having the signal strength greater than or equal to the minimum allowable interrogator signal level and less than or equal to the maximum allowable interrogator level, and
wherein each selective response by the RF device is based on comparing the sent interrogator signal to the stored comparison criteria.

17. A Radio Frequency Identification (RFID) system, comprising:
an interrogator sending a plurality of outgoing signals, wherein each of the outgoing signals has a different outgoing signal strength; and
a calibration device backscattering the outgoing signals from the interrogator;
wherein the system is operable such that, for each of the outgoing signals, a table stores the outgoing signal strength of the outgoing signal;
wherein the system is operable such that for each of the outgoing signals, the interrogator receives a corresponding backscatter signal from the calibration device such that a plurality of backscatter signals are received from the calibration device, wherein each of the backscatter signals has a different backscatter signal strength;
wherein the system is operable such that, for each of the received backscatter signals from the calibration device, the table stores the backscatter signal strength of the backscatter signal, wherein each of the stored backscatter signal strengths is stored in association with the stored outgoing signal strength of the corresponding outgoing signal that prompted the backscatter signal having the backscatter signal strength;
wherein the table is analyzed,
wherein the interrogator is set
to selectively respond only to RFID tags returning a backscatter signal having at least a desired strength when the interrogator sends a second outgoing signal at a predetermined strength, and
to not respond to the RFID tags within an effective communications range of the interrogator but returning a backscatter signal below the desired strength when the interrogator sends the second outgoing signal at the predetermined strength,
wherein the desired strength is selected based on the analysis of the table, and the desired strength corresponds, in the table, to the predetermined strength of the second outgoing signal sent by the interrogator.

18. The system as recited in claim 17, wherein each of the RFID tags within the effective communications range of the interrogator are configured to emit a backscatter signal in response to receiving the second outgoing signal at the predetermined strength, wherein each emitted backscatter signal from one of the RFID tags is one of a plurality of backscatter signals from the RFID tags,
wherein the plurality of backscatter signals from the RFID tags comprise:
one or more backscatter signals from one or more of the RFID tags characterized by a signal strength greater than or equal to the desired strength, and
one or more backscatter signals from one or more of the RFID tags characterized by a signal strength below the desired strength.

19. A Radio Frequency Identification (RFID) system, comprising:
an interrogator configured to send an outgoing signal;
a calibration device configured to backscatter the interrogator signal; and
a plurality of RFID tags,
wherein the RFID tags are set to selectively respond to an interrogator signal having at least a minimum allowable interrogator signal level, and less than or equal to a maximum allowable interrogator level, wherein the minimum allowable interrogator signal level and the maximum allowable interrogator signal level are selected based on an analysis of a signal backscattered from the calibration device to the interrogator.

20. The system as recited in claim 19, wherein the interrogator signal has at least the minimum allowable interrogator signal level,
wherein at least one of the RFID tags that selectively responds to the interrogator signal emits a backscatter signal having a desired backscatter signal strength,
wherein the desired backscatter signal strength is greater than or equal to a strength of the backscatter from the calibration device, and
wherein the interrogator is further set to selectively respond only to backscatter signals having at least the desired backscatter signal strength.

21. A computer program product comprising a non-transitory computer useable medium including a non-transitory computer readable program, wherein the computer readable program when executed on a computing device causes the computing device to:
send a plurality of outgoing signals from an interrogator to a calibration device, wherein each of the outgoing signals has a different outgoing signal strength;
for each of the outgoing signals, store in a table the signal strength of the outgoing signal;
for each of the outgoing signals, receive a corresponding backscatter signal from the calibration device such that a plurality of backscatter signals are received from the calibration device, wherein each of the backscatter signals has a different backscatter signal strength;
for each of the received backscatter signals from the calibration device, store in the table the backscatter signal strength of the backscatter signal, wherein each of the stored backscatter signal strengths is stored in association with the stored outgoing signal strength of the corresponding outgoing signal that prompted the backscatter signal having the backscatter signal strength;
analyze the table; and
set the interrogator to selectively respond only to RFID tags returning a backscatter signal strength selected based on the analysis when the interrogator sends second outgoing signals at a predetermined strength,
wherein the predetermined strength is sufficient to enable effective communications with REID tags that return a backscatter signal below the selected strength when the interrogator sends the second outgoing signals at the predetermined strength, and
wherein the selected backscatter signal strength corresponds, in the table, to the predetermined strength of the second outgoing signals sent by the interrogator.

22. A computer program product comprising a non-transitory computer useable medium including a non-transitory computer readable program, wherein the computer readable program when executed on a computing device causes the computing device to:
send a signal from an interrogator to a calibration device;
receive a backscatter signal from the calibration device;
analyze the backscatter from the calibration device;
select comparison criteria based on the analysis of the backscatter signal, wherein the comparison criteria includes a minimum allowable interrogator signal level and a maximum allowable interrogator level; and
instruct an RF device to store the comparison criteria, such that the RF device stores the minimum allowable interrogator signal level and the maximum allowable interrogator level,
wherein the comparison criteria is used by the RF device to selectively respond to an interrogator signal having at least the minimum allowable interrogator signal level and less than or equal to the maximum allowable interrogator level.

23. The computer program product as recited in claim 22, wherein the computer readable program when executed on a computing device further causes the computing device to:
send a plurality of signals from the interrogator to at least the RF device, the signals comprising:
interrogator signals having a signal strength less than the minimum allowable interrogator signal level, and
interrogator signals having a signal strength greater than or equal to the minimum allowable interrogator signal level and less than or equal to the maximum allowable interrogator level, and
wherein the RF device selectively responds only to the interrogator signals having the signal strength greater than or equal to the minimum allowable interrogator signal level and less than or equal to the maximum allowable interrogator level, and
wherein each selective response by the RF device is based on comparing the sent interrogator signal to the stored comparison criteria.

24. A Radio Frequency Identification (RFID) system, comprising:
an interrogator configured to send a plurality of outgoing signals to a calibration device, and receive a corresponding backscatter signal from the calibration device for each of the outgoing signals, such that a plurality of backscatter signals are received from the calibration device;
wherein the system is operable such that each of the outgoing signals has a different outgoing signal strength,
wherein the system is operable such that, for each of the outgoing signals, a table stores the outgoing signal strength of the outgoing signal,
wherein the system is operable such that each of the backscatter signals has a different backscatter signal strength,
wherein the system is operable such that, for each of the received backscatter signals from the calibration device, the table stores the backscatter signal strength of the backscatter signal, wherein each of the stored backscatter signal strengths is stored in association with the stored outgoing signal strength of the corresponding outgoing signal that prompted the backscatter signal having the backscatter signal strength,
wherein the table is analyzed,
wherein the interrogator is set to selectively respond only to RFID tags returning a backscatter signal having at least a desired strength that is selected based on the analysis of the table,
wherein the interrogator is configured to receive backscatter responses from several RFID tags that are positioned within an effective communication range of the interrogator;
wherein the interrogator is configured to selectively respond only to those of the several RFID tags that return a backscatter response having at least the desired strength.

25. The system as recited in claim 24, wherein the desired strength is selected based on the analysis, and is equal to one of the backscatter signal strengths of one of the backscatter signals received from the calibration device.

26. The system as recited in claim 24, wherein the interrogator is configured to not respond to the RFID tags returning a backscatter response below the desired strength.

27. The system as recited in claim 26, wherein an outgoing signal strength used by the interrogator during the receiving the backscatter responses from the several RFID tags that are within the effective communication range of the interrogator at a present outgoing signal strength is the same outgoing signal strength used to selectively respond only to those of the several RFID tags that return the backscatter response having at least the desired strength.

28. The system as recited in claim 24, wherein an outgoing signal strength used by the interrogator during the receiving the backscatter responses from the several RFID tags that are within the effective communication range of the interrogator at a present outgoing signal strength is the same outgoing signal strength used to selectively respond only to those of the several RFID tags that return the backscatter response having at least the desired strength.

29. The system as recited in claim 24, wherein the backscatter responses include signals having less than the desired strength, and wherein the interrogator is further configured to selectively not respond to the signals having less than the desired strength.

30. A method, comprising:
sending a plurality of outgoing signals from an interrogator to a calibration device, wherein each of the outgoing signals has a different outgoing signal strength;
for each of the outgoing signals, storing in a table the outgoing signal strength of the outgoing signal;
for each of the outgoing signals, receiving a corresponding backscatter signal from the calibration device such that a plurality of backscatter signals are received from the calibration device, wherein each of the backscatter signals has a different backscatter signal strength;
for each of the received backscatter signals from the calibration device, storing in the table the backscatter signal strength of the backscatter signal, wherein each of the stored backscatter signal strengths is stored in association with the stored outgoing signal strength of the corresponding outgoing signal that prompted the backscatter signal having the backscatter signal strength;
analyzing the table; and
setting the interrogator to selectively respond only to RFID tags returning a backscatter signal strength selected based on the analysis when the interrogator sends second outgoing signals at a predetermined strength,
wherein the predetermined strength is sufficient to enable effective communications with RFID tags that return a backscatter signal below the selected strength when the interrogator sends the second outgoing signals at the predetermined strength.

31. The method as recited in claim 30, wherein the backscatter signal strength selected based on the analysis is equal to one of the backscatter signal strengths of one of the backscatter signals received from the calibration device.

32. The method as recited in claim 30, wherein the interrogator is configured to not respond to the RFID tags returning a backscatter response below the selected backscatter signal strength.

33. The method as recited in claim 30, further comprising:
receiving one or more returning backscatter signals from the RFID tags, at least some of the returning backscatter signals being below the selected strength;
analyzing the one or more returning backscatter signals; and
selectively not responding to the returning the backscatter signals below the selected strength.

34. A Radio Frequency Identification (RFID) system, comprising at least one interrogator configured to:
send a plurality of calibration signals from the interrogator to a calibration device, wherein each of the calibration signals has a different calibration signal strength;
receive a plurality of calibration backscatter signals from the calibration device in response to the calibration device receiving the calibration signals, wherein each of the calibration backscatter signals corresponds to one of the calibration signals, and each of the calibration backscatter signals has a different calibration backscatter signal strength;
wherein the system is operable such that, for each of the calibration signals, a table stores the calibration signal strength of the calibration signal;
wherein the system is operable such that for each of the received calibration backscatter signals from the calibration device, the table stores the calibration backscatter signal strength of the calibration backscatter signal, wherein each of the stored calibration backscatter signal strengths is stored in association with the stored calibration signal strength of the corresponding calibration signal that prompted the calibration backscatter signal having the calibration backscatter signal strength;
analyze the table;
define an interrogator signal strength based on the analysis;
select a backscatter signal strength based on the analysis, wherein the selected backscatter signal strength corresponds, in the table, to the interrogator signal strength defined based on the analysis;
set the interrogator to:
send signals at the interrogator signal strength; and
selectively respond to tags returning backscatter responses having at least the selected backscatter signal strength;
send one or more signals from the interrogator to a plurality of tags, each signal being characterized by the interrogator signal strength;
receive a backscatter response signal from at least one of the tags in response to the tag receiving the one or more signals from the interrogator, each backscatter response signal being characterized by a backscatter response signal strength;
receive backscatter responses from the tags; and selectively respond only to those of the plurality of tags that return a backscatter response having at least the selected backscatter signal strength.

35. The method as recited in claim 34, wherein the interrogator is set to selectively respond to one or more tags located within an effective communication range of the interrogator based on one or more of the interrogator signal strength and the backscatter response signal strength.

36. The method as recited in claim 34, wherein the interrogator is set to selectively respond to one or more tags located within an effective communication range of the interrogator based on the interrogator signal strength and the backscatter response signal strength.

* * * * *